United States Patent [19]

Gik et al.

[11] Patent Number: 4,663,891

[45] Date of Patent: May 12, 1987

[54] METHOD OF MACHINING A WORKPIECE WITH AN EDGE-TYPE ROTARY CUTTING TOOL

[75] Inventors: Lev A. Gik; Boris I. Vilensky, both of Kaliningrad, U.S.S.R.

[73] Assignee: Kalinigradsky Technical Institute of Fish Industry and Economy, Kaliningrad, U.S.S.R.

[21] Appl. No.: 221,994

[22] Filed: Jan. 2, 1981

[51] Int. Cl.$^4$ .............................................. B24B 1/00
[52] U.S. Cl. ........................................ 51/288; 51/250
[58] Field of Search ................. 51/288, 5 D, 246, 247, 51/248, 249, 250; 30/138, 139

[56] References Cited

U.S. PATENT DOCUMENTS

| | | | |
|---|---|---|---|
| 1,114,743 | 10/1914 | Fosterling | 51/246 |
| 1,331,596 | 2/1920 | Stukart | 51/247 |
| 2,207,433 | 7/1940 | Haswell | 51/247 |
| 2,278,576 | 4/1942 | Wildhaber | 51/288 |
| 3,305,974 | 2/1967 | Wilson | 51/5 D |
| 4,144,678 | 3/1979 | Ellwanger | 51/288 |

FOREIGN PATENT DOCUMENTS 460118  4/1975  U.S.S.R. ................................ 51/247

Primary Examiner—Frederick R. Schmidt
Assistant Examiner—Robert A. Rose
Attorney, Agent, or Firm—Fleit, Jacobson, Cohn & Price

[57] ABSTRACT

The method of machining a workpiece with an edge-type rotary cutting tool resides in the following: the process of workpiece machining is carried out concurrently with the process of resharpening the rotary cutting tool. The resharpening of the rotary cutting tool is applied to the relief surface of the tool edge except for the cutting lip thereof, and a wear land left on the relief surface of the tool edge. The width of the wear land is maintained, in the process of machining, within the limits assuring the tolerance margin specified for the dimension of the workpiece being machined.

6 Claims, 1 Drawing Figure

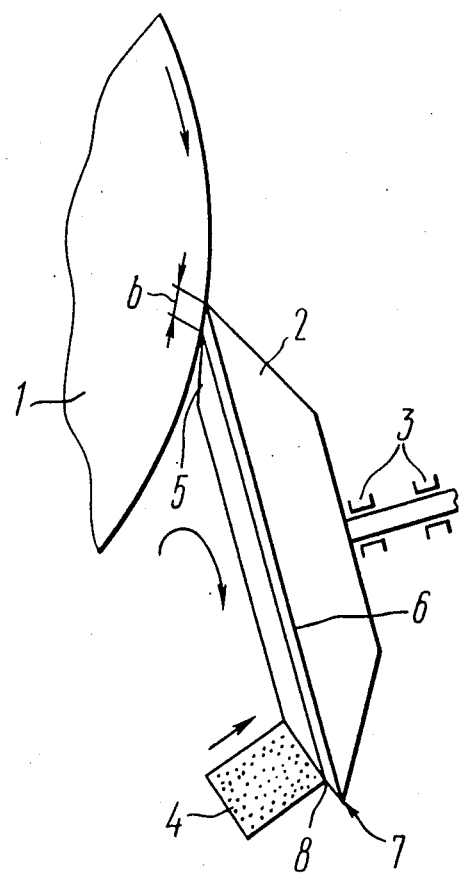

METHOD OF MACHINING A WORKPIECE WITH AN EDGE-TYPE ROTARY CUTTING TOOL

FIELD OF THE INVENTION

The herein-proposed invention relates to the field of mechanical engineering and has particular reference to a method of machining a workpiece with an edge-type rotary cutting tool.

The invention can find most utility when applied for machining large-sized heavy workpieces having an area exceeding 10 sq.m, or used under mass and large-lot production schedule.

The invention is likewise applicable in diverse branches of mechanical engineering, in particular for machining workpieces in multiple-tool machines.

BACKGROUND OF THE INVENTION

An edge-type cutting tool implies a tool having one or more cutting elements (also termed points or edges) shaped as a solid of revolution, such as a disk or cup, adapted to rotate round their own axis by virtue of interaction with the workpiece being machined, or from a self-contained drive.

Methods of machining a workpiece with said tool are now known to be in widespread and common practical use, wherein a wear land is liable to occur on the tool relief surface in the course of machining, said wear land increasing incessantly as the cutting proceeds. Such as increase of the wear land results in a greatly raised value of the radial component of the cutting force applied and in an abrupt elevation of the temperature in the zone of cutting, which in turn reduces accuracy and quality of machining and causes vibration of the entire system "machine - tool - workpiece". Further enlargement of the wear land results in the tool losing its cutting properties so that the tool performs only rolling of the surface being machined. Thus, the formation of a wear land growing continuously in the course of machining, imposes a limitation upon a possibility of applying the rotary cutting tool, despite its high cutting efficiency, for machining large-sized workpieces under mass and large-lot production conditions since said tool requires repeated resharpening, whereas each of such resharpenings involves removal of the tool from the machine, setting it on a tool grinder to be resharpened and then setting the tool on the machine again, whereupon the latter is additionally set up for a required workpiece dimension. All this results in highly increased handling time spent in the course of machining workpieces and hence in sharply raised prime cost thereof.

It is a primary object of the present invention to provide a method of machining a workpiece with an edge-type rotary tool which would increase the accuracy of the workpieces being machined.

It is another object of the present invention to provide a method of machining a workpiece with an edge-type rotary tool which would improve the quality of the workpieces being machined.

It is one more object of the present invention to provide a method of the character set forth hereinbefore which would feature high cutting efficiency.

Said and other objects of the present invention are achieved in a method of machining a workpiece with an edge-type rotary tool, residing in the following: machining a workpiece is carried out concurrently with resharpening said cutting tool; said resharpening of said rotary cutting tool is applied to the relief surface of the edge thereof save the cutting lip so as to leave a wear land on the edge relief surface; the width of said wear land is maintained during the machining process within the limits selected to suit the tolerance margin adopted for the dimension of the workpiece being machined.

Thanks to the fact that the machining of the workpiece occurs concurrently with the tool resharpening process, handling time involved in the workpiece machining is sharply reduced and hence the efficiency of the proposed method is increased.

A favorable effect of such an engineering solution is that tool resharpening that keeps intact the cutting lip of the tool edge and leaves a preset wear land on the edge relief surface is conducive to retaining, for a prolonged period of time, a preset tool geometry without any resetting of the tool for the dimension of the workpiece being machined. This eventually adds to the accuracy and improves the quality of the workpiece being machined.

The width of the wear land is most expedient to be maintained within 0.01 to 1.0 mm.

A wear land less than 0.01 mm wide is scarcely attainable from engineering viewpoint, whereas such land having a width over 1.0 mm will not provide for chip removal from the workpiece being machined because of too high a repulsive component of the cutting force.

From a technological viewpoint tool resharpening may be carried out by a grinding tool fixed stationary which is most simple and easy to effect from a construction viewpoint and involves no special tool resharpening devices and attachments.

In order to increase higher efficiency of the rotary tool resharpening process use may be made of a rotary grinding tool.

Preferably, the grinding tool is imparted rotation from the edge-type rotary tool, which enables one to dispense with a special tool resharpening drive.

When finishing machining of workpieces requiring inconsiderable thickness of chip to be removed (within 0.05 mm), rotation of the grining tool is preferably transmitted from a self-contained drive, since too low a torque is in this case applied to the cutting tool.

BRIEF DESCRIPTION OF THE DRAWINGS

Given below is a detailed description of a specific exemplary embodiment of the present invention with reference to the accompanying drawing which illustrates a schematic diagram showing the interaction of the rotary tool with the workpiece being machined and with a grinding tool (an abrasive tool in this particular case) which resharpens said rotary tool in the course of the workpiece machining, according to the present invention.

DETAILED DESCRIPTION OF THE INVENTION

A method of machining a workpiece with an edge-type rotary tool as diagrammatically represented in the accompanying drawing, resides in the following:

A fragmentary view of a workpiece 1 being machined is shown in the FIGURE.

An edge-type rotary cutting tool 2 is shaped as a disk mounted in bearings 3 and set in rotation due to interaction with the workpiece 1 being machined.

According to the invention, the process of machining the workpiece 1 is carried out concurrently with the process of resharpening the rotary cutting tool 2, i.e., both of said processes run concurrently.

Tool resharpening is effected by resorting to any techniques known to those skilled in the art, viz., abrasive, electrophysical, or electrochemical. A tool 4 effecting resharpening of the rotary cutting tool, is brought in contact, either continuously or intermittently, with a relief surface 5 of the rotary cutting tool 2. Grinding is applied to the relief surface 5 so as to remain intact a cutting lip 6 of an edge 7 of the rotary tool 2 and leave a wear land 8 on the relief surface 5 of the tool edge 7. The width "b" of the wear land 8 is maintained, in the course of machining, within the limits selected so as to suit the tolerance margin adopted for the dimension of the workpiece 1 being machined. Such limits are specified to be 0.01 mm and 1.0 mm.

Thus, for instance, in the case of finish or semifinish machining with a tolerance margin within 0.08 mm the width "b" of the wear land 8 is maintained within 0.3 mm, i.e., somewhat below the blunting criterion of an edge-type rotary cutting tool for a given kind of machining.

In the case of semifinish or other machining featuring a tolerance margin for a dimension in excess of 0.08 mm, the width "b" of the wear land 8 may be maintained within looser limits but it must not exceed 1.0 mm, as otherwise the cutting process might cease.

Resharpening of the rotary cutting tool may be carried out in the course of machining either with the stationary fixed grinding tool 4 or with such tool 4 rotatable in the course of machining.

Rotation to the grinding tool 4 may be imparted either from the edge-type rotary cutting tool 2 itself or from a self-contained drive (not shown).

DESCRIPTION OF THE PREFERRED EMBODIMENT

According to one of the specific preferred exemplary embodiments of the proposed method, there is machined a shaft for a paper-making machine, said shaft being made of chilled cast iron and featuring a diameter of 600 mm and a length of 6000 mm. The tolerance margin specified for a dimension is 0.05 mm.

The shaft is set on a lathe and rotated at a speed of 200 to 300 m/min. The rotary disk-shaped edge-type cutting tool is clamped in the lathe slide and set up for a preset machining dimension, whereupon said tool is imparted a feed motion at a rate of 0.4 to 0.8 mm per revolution. Then the cutting of the shaft occurs in the course of which the cutting element of the edge-type tool receives rotation due to the interaction with the shaft being machined. Then an abrasive tool is brought to the relief surface of the edge-type tool at some distance from the cutting zone, and is pressed with a controlled force against the rotary tool relief surface so as to resharpen said rotary tool. In the course of machining the shaft when the edge-type tool is rotated, the abrasive tool removes the allowance from the relief surface of the rotary cutting tool, thus resharpening the latter concurrently with the shaft machining process. In this case the force of pressing the abrasive tool against the relief surface of the rotary cutting tool is selected to be such that resharpening of the rotary tool maintains intact the cutting lip thereof and leaves a wear land on the tool edge relief surface, the width of said wear land being maintained permanently within 0.01 to 0.3 mm proceeding from a preset tolerance margin for the shaft dimensions.

As a result of the fact that the edge-type rotary tool is reground without interfering with the cutting lip thereof, the workpieces are machined to a high degree of accuracy, whereas any additional setting up of the tool is dispensed with as the size of the shaft machined surface remains constant. Keeping the width of the wear land on the edge relief surface of the rotary tool renders it possible to retain an optimum geometry of the tool cutting lip without removing the tool from the lathe for regrinding, thus ensuring high quality of the shaft machined surface, the required shaft dimensional accuracy, high machining efficiency and minimized handling time spent in the course of machining.

What is claimed is:

1. A method of machining a workpiece with an edge-type rotary cutting tool having a relief surface provided with a cutting lip and a wear land, consisting in the following:
   machining the workpiece; and
   concurrently resharpening said edge-type rotary cutting tool; said resharpening of said rotary cutting tool being carried out on the relief surface of the tool except for the cutting lip of said cutting tool; the resharpening leaving the wear land on the relief surface of said tool, and the width of said wear land being maintained, in the course of machining, within limits selected to suit the tolerance margin adopted for the dimension of the workpiece being machined.

2. A method as claimed in claim 1, further comprising maintaining the width of the wear land between 0.01 mm and 1.0 mm.

3. A method as claimed in claim 1, further comprising resharpening the edge-type rotary cutting tool with a grinding tool fixed stationary in the process of machining the workpiece with the rotary cutting tool.

4. A method as claimed in claim 1, further comprising resharpening the edge-type rotary cutting tool with a grinding tool rotating in the process of machining the workpiece with the rotary cutting tool.

5. A method as claimed in claim 4, further comprising imparting rotation to the grinding tool from the edge-type rotary cutting tool.

6. A method as claimed in claim 4, further comprising imparting rotation to the grinding tool from a self-contained drive.

* * * * *